United States Patent Office 3,707,553
Patented Dec. 26, 1972

3,707,553
TETRAMETHYLFORMAMIDINIUM ARENESULFO-NATES AND METHOD OF PREPARATION
George E. Bagley and Algirdas C. Poshkus, Lancaster, Pa., assignors to Armstrong Cork Company, Lancaster, Pa.
No Drawing. Filed Aug. 24, 1965, Ser. No. 482,284
Int. Cl. C07c 123/00
U.S. Cl. 260—501.14
8 Claims

ABSTRACT OF THE DISCLOSURE

Quaternary amidinium salts of the general formula:

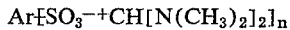

are readily synthesized by heating, at reflux, a mixture of dimethylformamide and an aromatic sulfonyl chloride. These compounds are useful as surface active agents, e.g. emulsifiers for waxes, emulsion stabilizers, aids in polymerization reactions, soiling inhibitors and foam stabilizers.

---

This invention relates to a method for the preparation of quaternary amidinium salts, more particularly a method of preparing tetramethylformamidinium arenesulfonates and to the new and useful compounds thereby produced.

We have found that tetramethylformamidinium arenesulfonates can be obtained almost quantitatively after a short reaction time by reacting aromatic sulfonyl chlorides with dimethylformamide. This is quite surprising since one might well expect that aromatic sulfonyl chlorides would be converted into N,N-dimethylsulfonamides by reaction with dimethylformamide analogous to the $ArSO_2Cl + Me_2NCHO \rightarrow ArSO_2NMe_2 + CO + HCl$ synthesis described by Coppinger for N,N-dimethylcarbonamides (J. Am. Chem. Soc. 76, 1372 (1954)).

The quaternary amidinium salts of this invention may be represented by the following general formula:

where $n$ is an integer from 1 to 2 and where Ar is a radical selected from the group consisting of

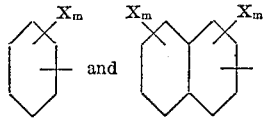

In the formulas $m$ is an integer from 0 to 3, and X is a radical selected from the group consisting of alkyl containing from 1 to about 18 carbon atoms, alkoxy containing from 1 to about 18 carbon atoms, halogen and nitro. The salts are readily synthesized by heating at reflux a mixture of dimethylformamide and an aromatic sulfonyl chloride. The reaction proceeds in accordance with the following:

The carbon monoxide and hydrogen chloride evolve almost quantitatively and the reaction is carried out easily and safely.

In order to further illustrate our invention, the following examples are given:

EXAMPLE 1

Preparation of tetramethylformamidinium benzene sulfonate

A mixture of distilled benzene sulfonyl chloride (8.83 grams; 0.05 mole) and dimethylformamide (7.3 grams; 0.10 mole) was refluxed at less than 170° C. for about four hours. During refluxing, the gases evolved were swept out with nitrogen and scrubbed through aqueous sodium hydroxide and 0.039 equivalents (80% yield) of hydrogen chloride were collected. Carbon monoxide was shown to be present by the black precipitate formed when the residual gases were bubbled through a palladium chloride solution.

The tan crystalline hygroscopic residue (12.7 grams), recrystallized from chloroform and was pale tan to almost white in color.

*Analysis.*—Calc'd for $C_{11}H_{18}O_3N_2S$ (258.4) (percent): 10.84 N; 12.41 S; 51.13 C; 7.04 H. Found (percent): 1086 N; 12.31 S; 50.99 C; 7.03 H.

EXAMPLE 2

Preparation of tetramethylformamidinium p-toluene sulfonate

A mixture of p-toluene sulfonyl chloride (9.53 grams; 0.05 mole) and dimethylformamide (7.3 grams; 0.10 mole) was refluxed at less than about 170° C. for about six hours. Again the gases evolved were swept out with nitrogen and were scrubbed through aqueous sodium hydroxide and a 72% yield of hydrogen chloride resulted with evidence for carbon monoxide as in Example 1. A small amount of white solid (m. 76°–80° C.; after recrystallization from ethanol m. 81°–82° C.) identified as N,N-dimethyl p-toluene sulfonamide had collected in the condenser and water-trap. Additional sulfonamide was recovered as an insoluble substance by filtering the aqueous solution of the reaction product. Evaporation of the filtrate led to recovery of the original salt as a brown waxy solid (9.05 grams).

EXAMPLE 3

Preparation of tetramethylformamidinium p-chlorobenzenesulfonate

To a solution of dimethylformamide (8.0 grams; 0.11 mole) in 10 ml. of o-dichlorobenzene was added p-chlorobenzenesulfonyl chloride (10.5 grams; 0.05 mole). A stream of nitrogen was bubbled through the mixture, which was heated at 160–180° C. for five and one-half hours.

The reaction mixture was allowed to cool to room temperature and a crystalline solid began to form. The partially solidified mixture was diluted with 20 ml. of benzene and filtered yielding 12.5 grams of off-white crystalline solid having a M.P. of 98–110° C. (86% yield). Recrystallization from iso-propanol ether gave a crystalline solid with a M.P. of 120–122° C.

*Analysis.*—Calc'd. for $C_{11}H_{17}ClN_2O_3S$ (292.82) (percent): C, 45.12; H, 5.86; N, 9.57; S, 10.95. Found (percent): C, 44.93; H, 5.89; N, 9.67; S, 11.09.

The salts of this invention are useful as surface active agents, e.g. emulsifiers for waxes, emulsion stabilizers, aids in polymerization reactions, soiling inhibitors and foam stabilizers. By way of example, tetramethylformamidinium dodecylbenzenesulfonate was prepared in accordance with the method of Example 3 with the reaction being carried out in o-dichlorobenzene solvent. The purified reaction product (1% by weight) was added to an immiscible mixture of equal parts of benzene and water. On shaking, an oil-in-water type emulsion of benzene in water was formed which was stable at the end of a four-day period.

We claim:
1. A compound of the formula:

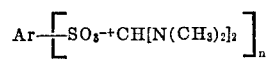

wherein $n$ is an integer from 1 to 2 and wherein Ar is a radical selected from the group consisting of

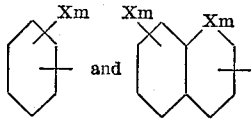

wherein $m$ is an integer of from 0 to 3 and X is a radical selected from the group consisting of alkyl containing from 1 to about 18 carbon atoms, and halogen.

2. Tetramethylformamidinium benzenesulfonate.
3. Tetramethylformamidinium p-toluenesulfonate.
4. Tetramethylformamidinium p-chlorobenzenesulfonate.
5. Tetramethylformamidinium dodecylbenzenesulfonate.
6. The method for making tetramethylformamidinium arensulfonates which comprises reacting, by refluxing with dimethylformamide, an aromatic sulfonyl chloride of the formula $Ar[SO_2Cl]_n$ wherein $n$ is an integer from 1 to 2 and wherein Ar is a radical selected from the group consisting

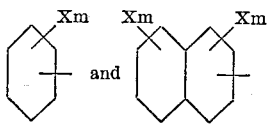

wherein $m$ is an integer from 0 to 3 and X is a radical selected from the group consisting of alkyl containing from 1 to about 18 carbon atoms, and halogen.

7. The method of forming tetramethylformamidinium benzene sulfonate which comprises refluxing a mixture of dimethylformamide and benzene sulfonyl chloride.
8. The method of forming tetramethylformamidinium p-toluene sulfonate which comprises refluxing a mixture of dimethylformamide and p-toluene sulfonyl chloride.

References Cited

UNITED STATES PATENTS

| | | | |
|---|---|---|---|
| 2,613,225 | 10/1952 | Miescher et al. | 260—564 |
| 3,073,851 | 1/1963 | Steiger | 260—501.14 |

OTHER REFERENCES

Arnold, C. Abstracts, vol. 52 (1959), col. 4120–1.
Foerst, Newer Methods of Preparative Organic Chemistry, vol. 3 (Publication Date—June 20, 1963), 282–3.
Ulery, J. Org. Chem. 30, 2464–5. (July 1965).

LEON ZITVER, Primary Examiner

M. W. GLYNN, Assistant Examiner

U.S. Cl. X.R.

106—2; 252—351, 382